United States Patent [19]

Conrad

[11] 4,304,963
[45] Dec. 8, 1981

[54] COMMUNICATIONS SYSTEM FOR REMOTE MONITORING

[75] Inventor: Ivan W. Conrad, Alexandria, Va.

[73] Assignee: United States of America, Washington, D.C.

[21] Appl. No.: 384,800

[22] Filed: Oct. 7, 1953

[51] Int. Cl.³ .............................................. H04K 1/00
[52] U.S. Cl. ............................ 179/1 MN; 179/81 E; 340/538
[58] Field of Search .................... 179/1, 1.2, 2, 1 MN, 179/81 E, 1.5 R; 340/538

[56] References Cited

U.S. PATENT DOCUMENTS 1,539,902  6/1925  Honaman
2,612,558  9/1952  Klipsch

Primary Examiner—Howard A. Birmiel

EXEMPLARY CLAIM

1. In a communication system for the transmission of electrical signals from a plurality of stations having a common power line located therein, the combination comprising a plurality of band-pass filters each having a different supersonic frequency band-pass range, a plurality of microphones each individually positioned within a different one of said stations and connected across the power line located therein through a different one of said filters, an alternating current generator for selectively generating supersonic frequencies corresponding to the band-pass frequencies for said filters connected across said power line said generator presenting to the line the conjugate of the impedance presented to the generator with the microphone loads connected across the line, two inductors having a relatively high impedance to the supersonic frequency of said generator each individually connected in series with a different conductor for said power line and positioned in the line between the power source for said line and the connection points of said generator to said line, an impedance bridge connected across said power line at a point more remote from the power source than said two inductors, said bridge having a relatively high impedance at said supersonic generator frequency and a detector connected to said impedance bridge for demodulating the modulation components superimposed upon said supersonic currents and generated by said microphone in response to sound energy impinging thereupon.

6 Claims, 1 Drawing Figure

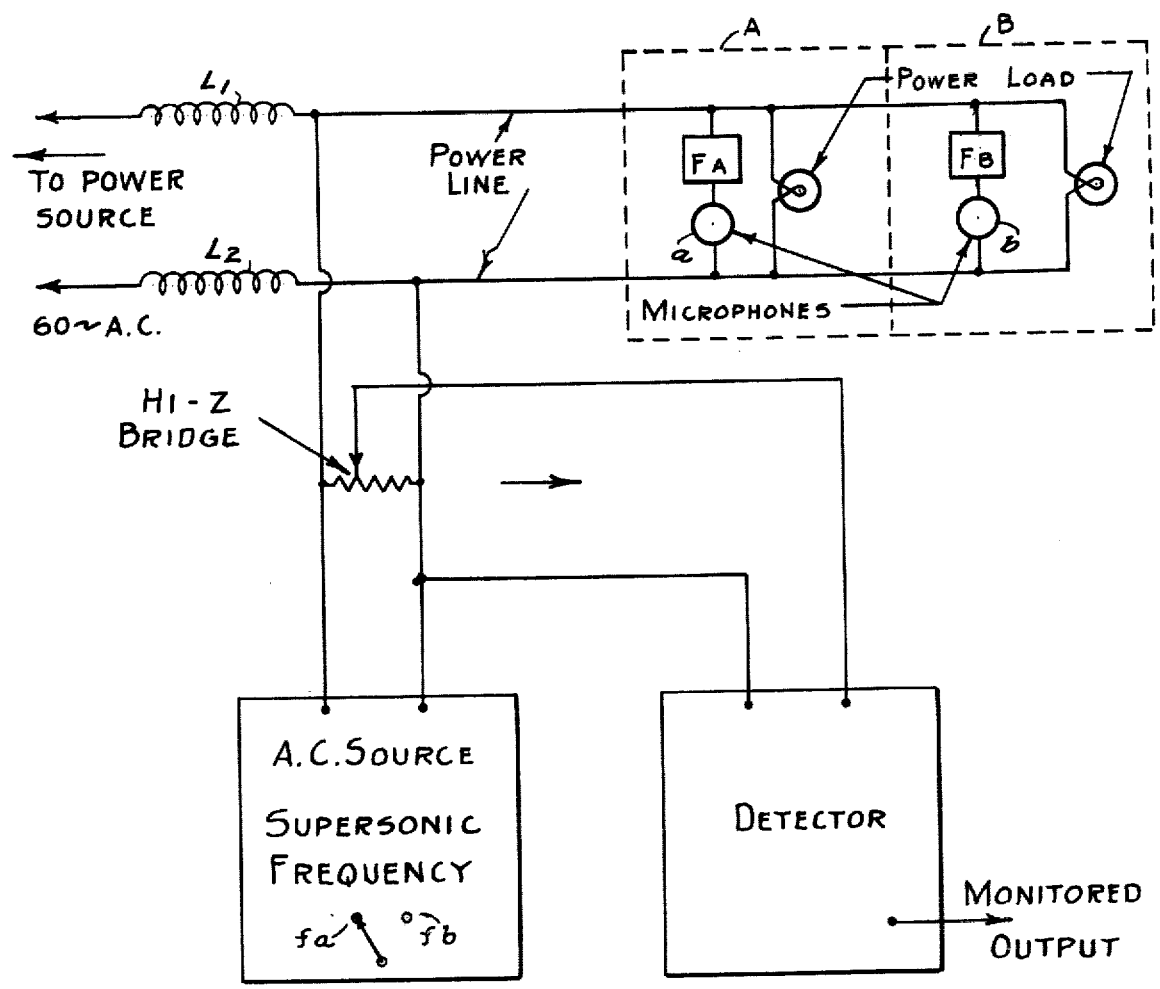

COMMUNICATIONS SYSTEM FOR REMOTE MONITORING

The invention described herein may be manufactured and used by or for the Government of the United States for governmental purposes without the payment to me of any royalty thereon in accordance with the provisions of the Act of Apr. 30, 1928 (Ch. 460, 45 Stat.L. 467), USC 35, Section 266.

This invention relates to an improved system for the transmission of signals over wires from one or more stations in which it is necessary to install microphones, but not feasable for reasons such as concealment and lack of sufficient installation time and space to install the wires and associated equipment usually required to transmit the microphone signals to a remote receiving station.

It is a principal feature of this invention to utilize the power line facilities present at a transmitting station to complete a microphone circuit to a remote receiving station. A supersonic-frequency, alternating-current source located at the receiving station transmits the energizing currents for a microphone connected to a power line outlet at the transmitting station, and the modulation components produced are returned over the power line to the receiving station where they are detected.

A second feature of this invention embodies a plurality of microphone-filter combinations, each located at an associated transmitting station and connected to common power line facilities, whereby the transmission of appropriate supersonic frequencies over the power line from a source remote to the transmitting stations energizes a desired one of said microphone so that signals may be transmitted from the selected station.

As is shown in the accompanying drawing of a preferred embodiment of the invention herein, carbon microphones a and b are connected across the common power line located in rooms A and B respectively. Filters $F_a$ and $F_b$ are narrow band-pass filters which offer a relatively high impedance to all currents with the exception of a narrow band within a supersonic frequency range. These filters may be, for example, series resonance circuits comprising a serially connected inductor and capacitor having supersonic resonant frequencies of $f_a$ and $f_b$. It, therefore, follows that supersonic currents applied to the power line and having a frequency of $f_a$ will energize microphone a to the exclusion of microphone b, whereas supersonic currents having a frequency of $f_b$ will energize microphone b to the exclusion of microphone a. Filters $F_a$ and $F_b$ also present a sufficiently high impedance to the low-frequency, power line, supply currents to prevent objectionable low-frequency currents from flowing through the associated microphones.

A generating source of supersonic frequencies $f_a$ and $f_b$ is located at a remote receiving station to provide the necessary power for the activation of the microphones. The impedance presented to the power line by the generating source is preferably the conjugate of the impedance presented to the generator by the power line with its microphone load at the supersonic operating frequency. Radio frequency chokes $L_1$ and $L_2$ are installed in the individual lines between the supersonic source and the power line source so as to isolate that part of the power line toward the power source. These chokes offer a high impedance to the supersonic energy and therefore do not load or lower the Q of the microphone circuit; however, they do offer a very low impedance to the line currents and have sufficient current capacity to carry the lighting and appliance load of the transmitting stations without appreciable voltage drop.

With the generating source adjusted to a conjugate impedance match with the power line and microphone load, a high Q resonant condition exists, resulting in a high circulating supersonic current through the selected microphone. This current is limited in magnitude only by the over-all resistance of the circuit. The impedance of the normal lighting and appliance load and the nonselected microphone-filter combination is so high at these frequencies in comparison to that of the selected microphone that very little shunting of the circuit is effected.

Since the carbon microphone is for the most part resistive, any change in its resistance, such as would occur when an audible sound is impressed upon its diaphragm, changes the Q of the resonant circuit causing amplitude modulation of the supersonic energy. Accompanying the amplitude modulation, is a certain amount of phase modulation and in some instances frequency modulation.

This phase modulation exists because of a change in the reflection coefficient at the microphone end of the line when the microphone is modulated. This change in the reflection coefficient causes a shift in both the amplitude and the displacement or phase of the standing wave at every point on the line, thus causing phase modulation. In the case of a free running oscillating source where the oscillator is tuned by the line itself, this shift in the reflection coefficient causes both amplitude and frequency modulation to be produced.

In order to detect or demodulate this modulated supersonic energy at the receiving station, a high impedance circuit is bridged across the line at this station for the purpose of coupling this modulated energy without detrimental loading into a conventional detector of a type suited to recovery of the modulated component desired. The detector demodulates the modulated supersonic energy, thus recovering the audible intelligence that was impressed upon the diaphragm of the microphone.

If a given installation requires only a single microphone, a narrow band-pass filter is not required as it is not necessary to discriminate between a plurality of microphone stations. A capacitor having sufficient reactance at the power line supply frequency to block objectionable line currents from flowing through the microphone is sufficient filter.

It is to be understood that the above-described arrangement is illustrative of the application of the principles of this invention. Numerous other arrangements may be devised by those skilled in the art without departing from the scope of this invention.

I claim:

1. In a communication system for the transmission of electrical signals from a plurality of stations having a common power line located therein, the combination comprising a plurality of band-pass filters each having a different supersonic frequency band-pass range, a plurality of microphones each individually positioned within a different one of said stations and connected across the power line located therein through a different one of said filters, an alternating current generator for selectively generating supersonic frequencies corresponding to the band-pass frequencies for said filters connected across said power line said generator presenting to the line the conjugate of the impedance presented to the generator with the microphone loads connected across the line, two inductors having a relatively high impedance to the supersonic frequency of said generator each individually connected in series with a different conductor for said power line and positioned in the line between the power source for said line and the connection points of said generator to said line, an impedance bridge connected across said power line at a point more remote from the power source than said two inductors, said bridge having a relatively high impedance at said supersonic generator frequency and a detector connected to said impedance bridge for demodulating the modulation components superimposed upon said supersonic currents and generated by said microphone in response to sound energy impinging thereupon.

2. In a communication system for the transmission of electrical signals from a plurality of stations having a common power line located therein, the combination comprising a plurality of band-pass filters each having a different supersonic frequency band-pass range, a plurality of microphones each individually positioned within a different one of said stations and connected across the power line located therein through a different one of said filters, an alternating current generator for selectively generating supersonic frequencies corresponding to the band-pass frequencies for said filters connected across said power line said generator presenting to the line the conjugate of the impedance presented to the generator with the microphone loads connected across the line, an impedance bridge having a relatively high impedance at said supersonic generator frequency and being connected across said power line, and a detector connected to said impedance bridge for recovering the modulation components superimposed upon said supersonic currents and generated by said microphone in response to sound energy impinging thereupon.

3. In a communication system for the transmission of electrical signals from a station having a power line therein, the combination comprising a capacitor, a carbon microphone positioned within the transmitting station and connected across the power line through said capacitor, a supersonic frequency alternating-current generator connected across said power line at a point remote from said transmitting station, said generator presenting to the line the conjugate of the impedance presented to the generator with the microphone connected across the line, two inductors having a relatively high impedance to the supersonic frequency of said generator each individually connected in series with a different conductor for said power line and positioned in the line between the power source for said line and the connection points of said generator to said line, an impedance bridge positioned at said remote point having a relatively high impedance at said supersonic generator frequency and being connected across said power line, and a detector connected to said impedance bridge for demodulating the modulation components superimposed upon said supersonic currents and generated by said microphone in response to sound energy impinging thereupon.

4. In a communication system for the transmission of electrical signals from a station having a power line outlet therein, the combination comprising a microphone positioned within the transmitting station and connected to said power line, a supersonic alternating-current frequency generator connected to said power line at a point remote from said transmitting station, a supersonic frequency line inductor connected to said power line and isolating the power source for said power line from the high frequency currents generated by said supersonic frequency generator, an impedance network positioned at said remote point having a relatively high impedance at said supersonic generator frequency and being connected across said power line, and a detector actuated by the supersonic voltage developed across at least a portion of said network whereby the modulation components of said supersonic voltage generated by said microphone are demodulated.

5. In a communication system for the transmission of electrical signals from a station having an electrical supply line permanently associated therewith, the combination comprising a microphone positioned within the transmitting station and connected across the electrical supply line, means for effectively isolating said microphone from the electrical currents flowing in said supply line at the normal and usual supply current frequency, a supersonic frequency source connected to said supply line at a point remote to said transmitting station, a supersonic frequency line inductor connected to said supply line and isolating the permanent power source for said supply line from the high frequency currents generated by said supersonic frequency generator, an impedance network positioned at said remote point having a relatively high impedance at said supersonic generator frequency and being connected across said supply line, and a detector actuated by the supersonic voltage developed across at least a portion of said network whereby the modulation components of said supersonic voltage generated by said microphone are demodulated.

6. In a communication system for the transmission of electrical signals from a station having a power line associated therewith, the combination comprising means for translating sound energy into electrical energy, said translating means being positioned within the transmitting station and connected to said power iine, means for effectively isolating said translating means from the currents transmitted over said power line at the power supply frequency, a supersonic frequency source connected to said power line at a point remote to said transmitting station, and a detector connected to said line at said remote point for demodulating the modulation components of the supersonic carrier currents generated by said translating means in response to sound energy within said transmitting station.

* * * * *